No. 697,857. Patented Apr. 15, 1902.
B. LEITMAYR.
CIRCULAR SAW.
(Application filed Apr. 5, 1900.)
(No Model.) 3 Sheets—Sheet 1.
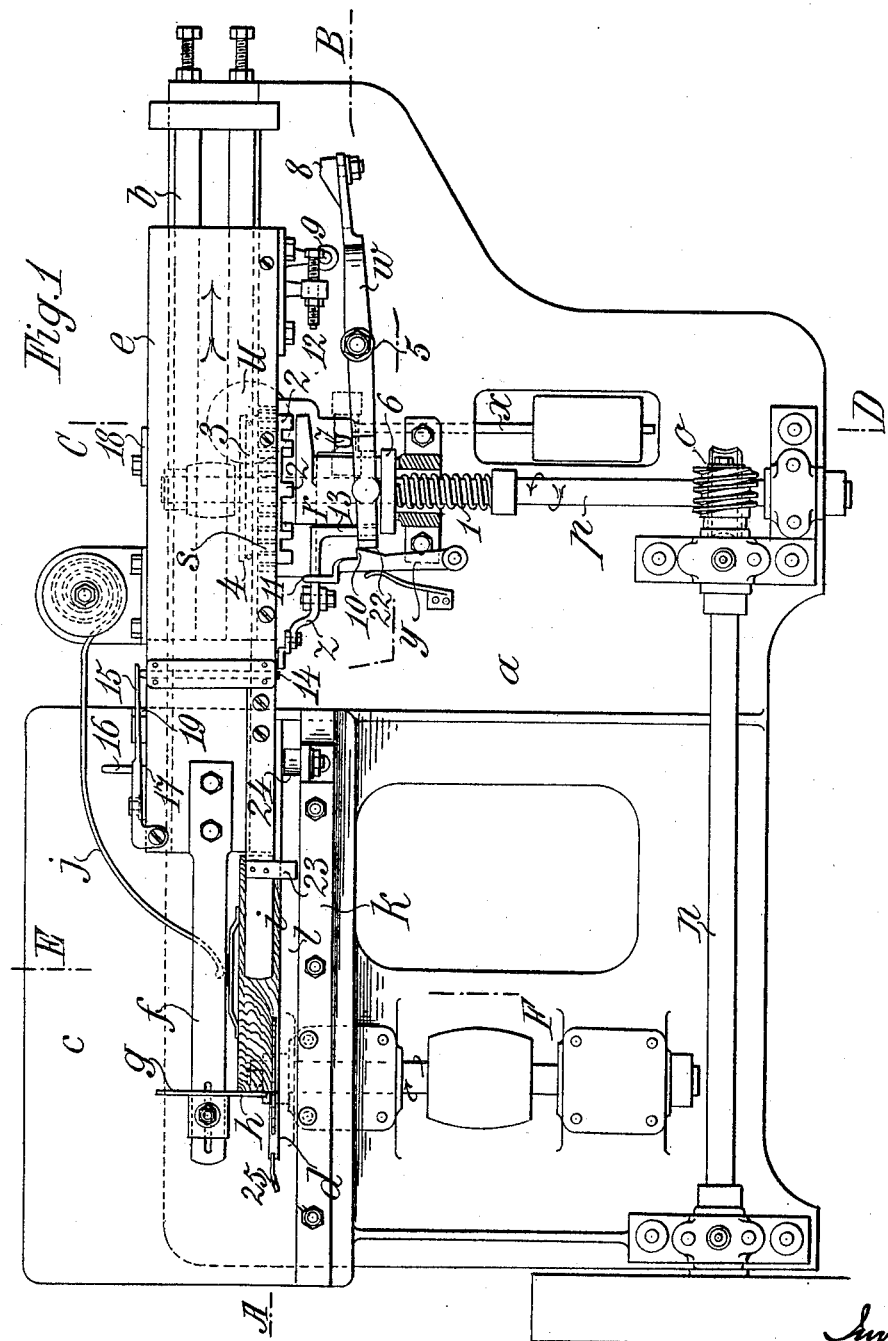

No. 697,857. Patented Apr. 15, 1902.
B. LEITMAYR.
CIRCULAR SAW.
(Application filed Apr. 5, 1900.)
(No Model.) 3 Sheets—Sheet 2.
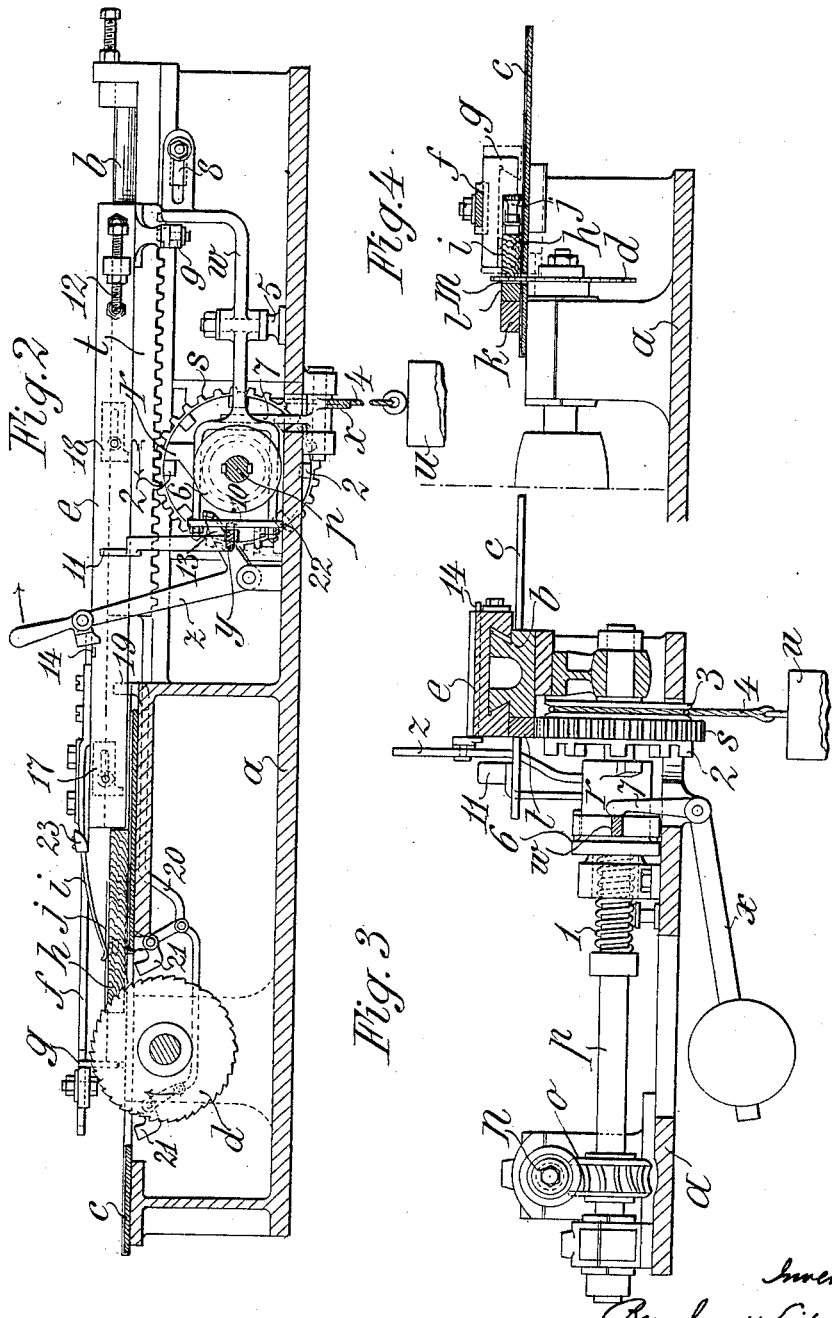

No. 697,857. Patented Apr. 15, 1902.
B. LEITMAYR.
CIRCULAR SAW.
(Application filed Apr. 5, 1900.)
(No Model.) 3 Sheets—Sheet 3.
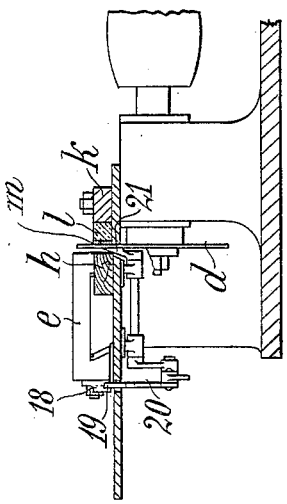
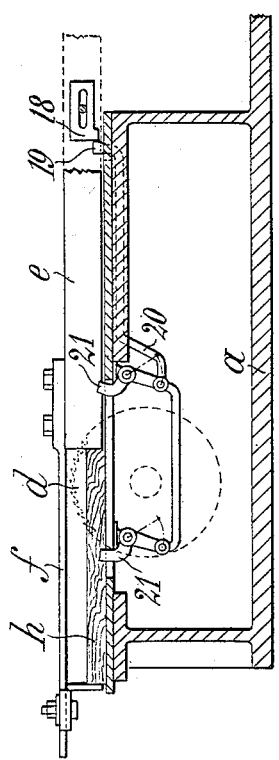
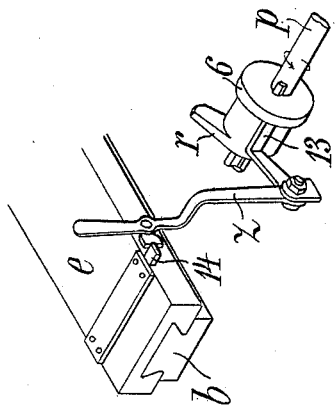
Witnesses:
Inventor:
Bernhard Leitmayr.
by
Atty.

UNITED STATES PATENT OFFICE.

BERNHARD LEITMAYR, OF MOLLN, AUSTRIA-HUNGARY.

CIRCULAR SAW.

SPECIFICATION forming part of Letters Patent No. 697,857, dated April 15, 1902.

Application filed April 5, 1900. Serial No. 11,770. (No model.)

*To all whom it may concern:*

Be it known that I, BERNHARD LEITMAYR, a subject of the Emperor of Austria-Hungary, residing at Molln, in the Province of Upper Austria, in the Empire of Austria-Hungary, have invented certain new and useful Improvements in Circular Saws; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to a circular saw for cutting thin laths or strips, such as those used for making rules, scales, and the like, in which the forward and backward feeding of the work in the direction of the cut, the adjustment of the same against a gage or guide after the cutting off of a lath or strip, as well as the arresting of the feed mechanism after the cutting off of the last lath or strip, are effected automatically.

My improved circular saw is shown in the accompanying drawings, in which—

Figure 1 is a plan of the improved saw with the feed carriage or slide moved back beyond the middle position. Fig. 2 is a longitudinal section on the line A B, Fig. 1, wherein the mechanism for moving the slide is shown with the clutch for feeding the slide forward in gear. Fig. 3 is a transverse section on the line C D, Fig. 1, through the driving mechanism for the slide. Fig. 4 is a transverse section on the line E F, Fig. 1. Fig. 5 is a side view of the means to cam the block of wood from the saw during the return of the carriage. Fig. 6 is an end view of the same, and Fig. 7 is a perspective view showing how the lever $z$ holds the clutch out of engagement.

As will be seen, a bed $b$ is arranged on the base-plate $a$, on which bed a slide $e$ can move directly over the table $c$ of the circular saw $d$. This carriage or slide $e$ bears at its front end a bar $f$, with an adjustable stop $g$, between which stop and the front end of the slide is placed the board or slab $h$ to be cut into laths or strips. The board $h$ is pressed by means of springs $i$ and $j$, mounted on the carriage or slide $e$, at one side against the surface of the table and at the other side against a gage or guide $l$, secured to a flange or ledge $k$ on the table. By the distance of the gage $l$ from the plane of the circular saw is determined the thickness of the lath or strip $m$ to be cut off, Figs. 4 and 6. The reciprocating motion of the slide $e$ is effected by means of a shaft $p$, which is rotated with retarded velocity by a motion-shaft $n$ and the worm-gear $o$. On the shaft $p$ are mounted a movable clutch member $r$, acted upon by the spring 1 and rotating with the shaft, and a loose spur-wheel $s$. This spur-wheel, which engages with a rack $t$ on the slide, is provided on its flat side with a number of laterally-projecting teeth 2 and also with a cord-groove 3, in which is secured one end of a cord 4, the other end of the said cord bearing a weight $u$. A lever $w$ is pivotally mounted at 5 on the base-plate $a$, and the forked front end of this lever engages with a flange 6 on the movable clutch member $r$, against which it is pressed by the short arm 7 of a weighted lever $x$, pivotally mounted at the under side of the base-plate, while the rear end of the lever $w$ bears an adjustable projection 8, which is acted upon by a roller 9 on the slide.

In order to arrest the motion of the lever $w$, the base-plate also bears a pivoted lever $y$, Fig. 1, acted upon by a spring and having a projection 10 and an upwardly-extending arm 11, on which acts an adjustable projection 12 on the slide.

A stop 19, formed on a rod 20, Fig. 2, and projecting from the table, is actuated by means of projections 17 and 18, adjustably mounted on the slide, and this rod 20 is connected with cam-fingers 21 21, which can move near the flat surface of the circular saw. These cam-fingers serve for pushing the board or slab to one side in the return motion thereof away from the saw, so that the cut surface is not damaged by the saw—*i. e.*, a clean smooth cut surface is obtained.

The permanent throwing out of gear of the clutch for the purpose of stopping the slide is effected by means of a hand-lever $z$, pivotally mounted on the base-plate. The arm 13 of this lever extends up to the flange 6 of the clutch member $r$, and the said lever is actuated by an adjustable projection 14, on which a lever 15, pivoted to the slide, presses as soon as the pin 16 of this lever comes into engagement with the spring $j$.

The operation of my improved saw is as follows: Assuming that the carriage or slide $e$ is in its extreme right-hand position, in which the spring $i$ is raised somewhat by the passage of its projection 23, Fig. 1, on to the inclined projection 24, so that the board or slab $h$ can be pressed unimpeded against the gage $l$ by means of the spring $j$. The spring $i$ comes into operation again immediately the slide begins its travel. In the extreme right-hand position of the slide the roller 9 engages with the wedge-shaped projection 8 on the lever $w$, so as to oscillate the said lever and raise the weighted lever $x$. While the lever $w$ is arrested by the passage of the projection 10 on the lever $y$ behind the bar 22 the movable clutch member $r$ effects the coupling of the driving-shaft $p$ with the spur-wheel $s$, in which operation the said clutch member snaps between the teeth 2 of the spur-wheel by the pressure of the spring 1. The toothed wheel is rotated by means of the said clutch member and the weighted cord thus simultaneously wound up, whereby the slide is moved forward, so as to feed the work against the saw, in which operation the lath or strip $m$ is pressed somewhat to one side during the cut by means of a curved spring 25, Fig. 1. When a lath $m$, Fig. 4, has been cut off, the arrangement for laterally lifting away the work is actuated by the engagement of the projection 18 with the projection 19, and at the same time the latch $y$ is moved laterally by the engagement of the projection 12 with the arm 11 of the said lever, whereby the projection 10 on the said lever is caused to release the bar 22. The lever $w$, being now released, throws the clutch member $r$ out of gear under the action of the weighted lever $x$ and at the same time puts the spring 1 under compression. By the action of the weight $u$ the spur-wheel $s$ is turned in the opposite direction and the slide moved back, during which operation the arrangement 21 for laterally lifting the work is thrown out of gear by means of the projection 17, and the lever $w$ is actuated again.

The above-described operations are repeated until the last lath or strip is cut, after which the action of the slide is automatically stopped. This automatic stopping of the slide $e$ is effected as follows: After the cutting off of the last strip the inwardly-bent spring $j$ presses on the pin 16 of the lever 15, whereby the projection 14 is pushed out of the slide. If now the slide moves back, the projection 14 presses against the lever $z$, whereby the latter is moved toward the right, and its arm 13 comes in front of the flange 6 on the movable clutch member which is out of gear, and thus prevents the latter from being again released. After the introduction of a fresh board or slab the projection 14 is pushed back by hand and the lever $z$ moved to the left, whereby the arm 13 moves away from the flange on the clutch member $r$, and the latter can be again thrown into gear.

I claim—

1. In a machine of the class described, the combination with a suitable table, a saw and a carriage reciprocable on the table, of devices mounted independently of the carriage and operated thereby to engage and shift the work from the saw, substantially as described.

2. In a machine of the class described, the combination with a suitable table, a saw and a carriage reciprocable on the table, of devices to exert pressure on and hold the work in position to be cut by the saw, and devices independent of and operated by the carriage to engage and shift the work from the saw against the action of the holding devices, substantially as described.

3. In a machine of the class described, the combination with a suitable table and saw, of a reciprocable carriage, a guide to regulate the thickness of material to be cut, means for holding the material against said guide, a device for holding it down on the table and a stop mechanism for said carriage arranged to be operated by said means to stop the carriage, substantially as described.

4. In a machine of the class described, the combination with a suitable table and saw, of a reciprocable carriage, a guide, means for holding the material to be cut against said guide, a device for holding the material down on the table, mechanism for shifting the material from the saw at the end of each cut and operated by the carriage and a stop mechanism arranged to be operated by the means for holding the material against the guide when substantially all of the material has been cut in order to stop said carriage, substantially as described.

5. In a machine of the class described, a reciprocable carriage, a rack thereon, a gear-wheel arranged to engage the rack to drive the carriage forward, a shaft, a clutch on the shaft arranged to engage said gear-wheel, a clutch-operating mechanism arranged to automatically disconnect said shaft and wheel, a weight arranged to return the carriage to position to start its forward travel, a spring to hold the work, a lever to hold the clutch out of engagement and a projection 14 moved by said spring to move the lever to stop the machine, substantially as described.

6. In a machine of the class described, a reciprocable carriage, a wheel arranged to drive said carriage forward, a driving-shaft and a clutch thereon, a clutch device on the shaft arranged to engage said wheel, a clutch-operating mechanism arranged to disconnect said clutch and wheel at the end of its forward travel and connect them again at the end of its rearward travel, a weight arranged to move the carriage rearward, and means operated from the carriage to hold the clutch permanently disengaged, substantially as described.

7. In a machine of the class described, a reciprocable carriage, a rack thereon, a driving-shaft, a spring-actuated clutch thereon, a gear-wheel engaging the rack and arranged to be coupled to the shaft by said clutch, a weighted bell-crank lever arranged to move the clutch against the stress of its spring, a second lever operated from the carriage arranged to displace the bell-crank lever to allow the clutch to engage the gear-wheel and to disengage it again at the end of the forward travel of the carriage and means for causing the return travel of said table, substantially as described.

8. In a machine of the class described, a reciprocable carriage, and a rack and gear-wheel for moving it forward, a driven spring-held clutch arranged to engage said wheel, a lever acting on the clutch, a weighted bell-crank lever acting on the latter, means at one end of the carriage to engage the first-mentioned lever to allow the engagement of clutch and wheel, a latch to lock the first-mentioned one when moved, and a device on the carriage, whereby said latch is moved to allow the weighted bell-crank lever to act on the first-mentioned one to move the clutch out of engagement with the wheel and against the stress of its spring, substantially as described.

9. In a machine of the class described, the combination with a table, a reciprocable carriage thereon, a saw and mechanism to reciprocate the carriage, of cam-fingers connected together, a rod to simultaneously move them, a stop on the carriage to move said rod at substantially the end of its forward travel to rotate the cam-fingers into the kerf to move the uncut work transversely of the carriage, substantially as described.

In testimony that I claim the foregoing as my invention I have signed my name in presence of two subscribing witnesses.

BERNHARD LEITMAYR.

Witnesses:
   JOSEF RUBARCH,
   AUGUST FUGGER.